Sept. 18, 1945. F. C. PETHICK 2,385,025
MEANS FOR LOADING AND UNLOADING VEHICLES
Filed July 3, 1942 2 Sheets-Sheet 1
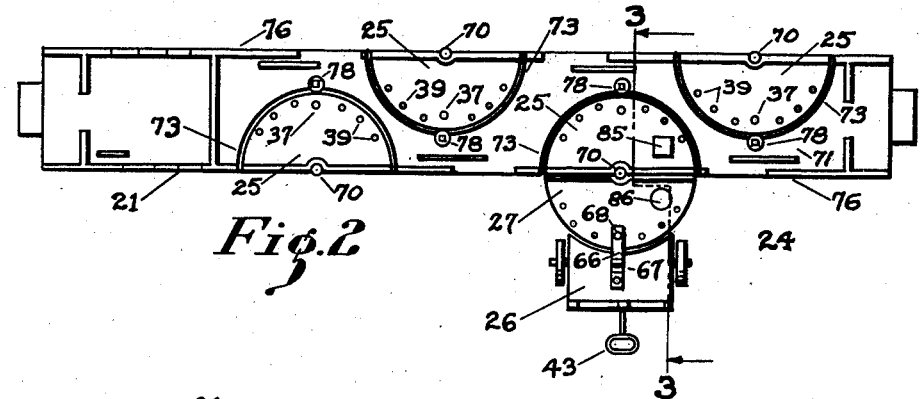
Fig.2
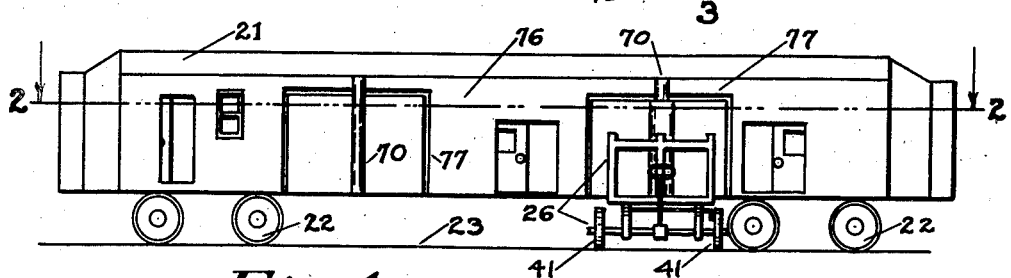
Fig.1
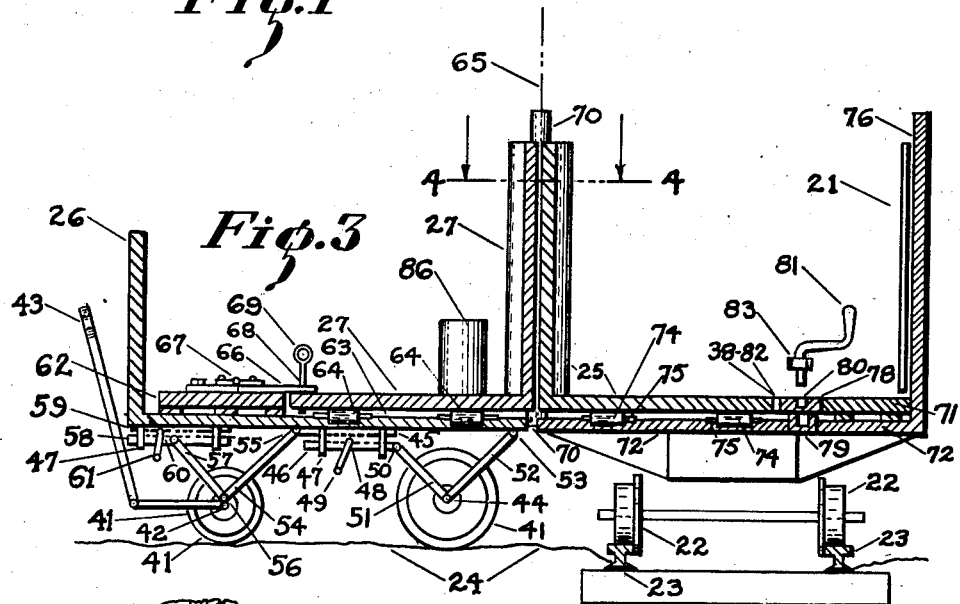
Fig.3
Fig.4
INVENTOR
Ford C. Pethick Sept. 18, 1945. F. C. PETHICK 2,385,025
MEANS FOR LOADING AND UNLOADING VEHICLES
Filed July 3, 1942 2 Sheets-Sheet 2
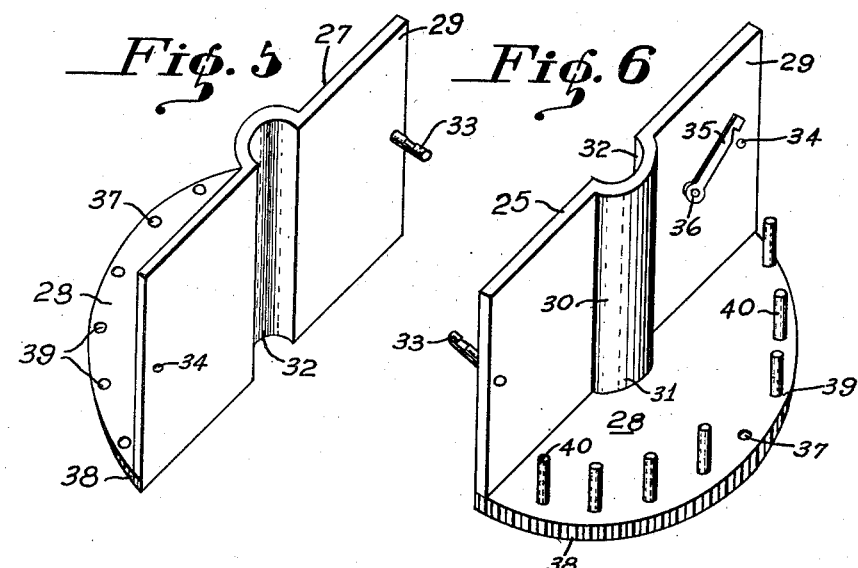
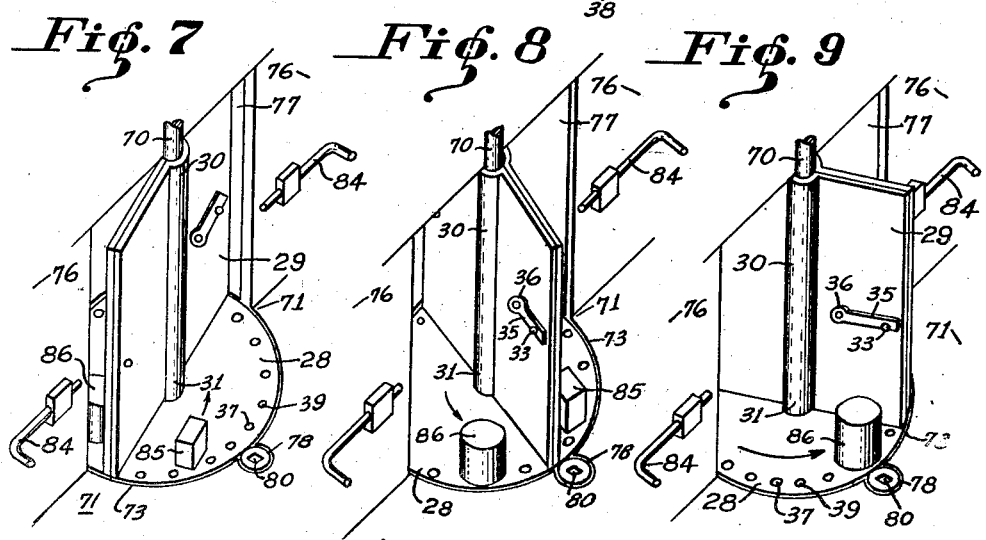
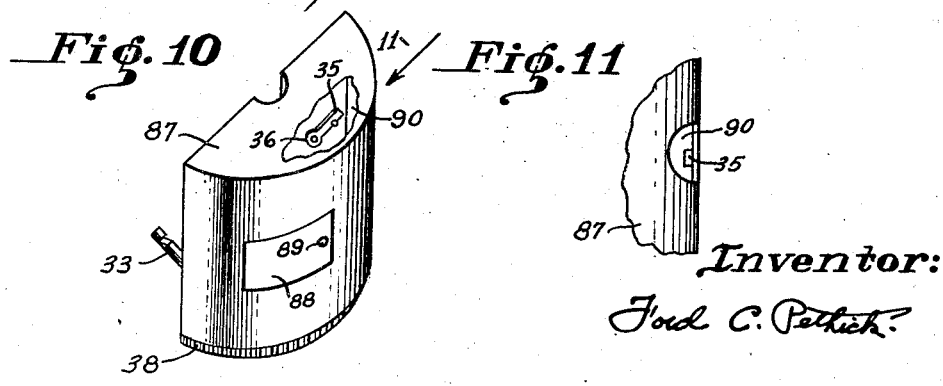
Inventor:
Ford C. Pethick Patented Sept. 18, 1945                                                             2,385,025

UNITED STATES PATENT OFFICE 2,385,025

MEANS FOR LOADING AND UNLOADING VEHICLES

Ford C. Pethick, Scranton, Pa.

Application July 3, 1942, Serial No. 449,641

17 Claims. (Cl. 214—38)

This invention relates to means for rapidly loading and unloading baggage, express, and mail from railroad cars, busses or other vehicles, and has for its object the provision of an improved and simplified device of this character.

Many passenger trains and busses carry a certain amount of baggage, express, and mail. It frequently happens that these passenger trains or busses are held at stations for long periods while a few employees first unload and then load a large amount of baggage, express, and mail. The delay caused by unloading and loading this impedimenta is not only an annoyance to the passengers but is also costly to the railroad or bus company. Therefore it is very desirable that the loading and unloading operation be performed in the shortest possible time. The method and means of unloading and loading baggage, mail, and express from cars and busses which have heretofore been used have left much to be desired. It is, therefore, an important object of this invention to provide means of unloading and loading baggage, mail, express or freight from cars, busses and other vehicles.

It is a further object of this invention to provide a suitable means of unloading the incoming baggage by the same operation and at the same time that the outgoing baggage is being loaded.

It is a still further object of this invention to provide a new and improved baggage truck for use in loading and unloading baggage to and from cars or busses.

It is a still further object of this invention to provide a means for loading and unloading baggage cars which will in no way interfere with the normal use and operation of the car.

Another object of this invention is to provide an entirely new and improved type of container for use in shipping less than car load lots by express, freight etc.

The above and other important objects of this invention will appear in more detail during the course of the following description.

In accordance with this invention in one form thereof a suitable half-turntable is built into a car or bus structure and an identical half-turntable is mounted on a truck. Provision is made whereby these two half-turntables may be coupled together and rotatably interchanged so that the half-turntable, which was originally on the car or bus, rests on the truck and vice versa.

For a more complete understanding of this invention, reference should be had to the accompanying drawings in which:

Figure 1 is an elevational view of a baggage car showing one form of apparatus embodying this invention, Figure 2 is a horizontal sectional view taken through the line 2—2 of Figure 1 and looking in the direction of the arrows, Figure 3 is a vertical sectional view taken through the line 3—3 of Figure 2 and looking in the direction of the arrows, Figure 4 is a fragmentary cross section taken through the line 4—4 of Figure 3 and looking in the direction of the arrows, Fig. 5 is a perspective view of a half-turntable which forms part of this invention, Figure 6 is a perspective view of a half-turntable similar to the one shown in Figure 5, but as viewed from the opposite side, Figure 7 is a fragmentary perspective view taken from inside of a car, which has been equipped with one embodiment of this invention. The half-turntables are shown as being partly rotated in the performance of the loading and unloading operation, Figure 8 is similar to Figure 7 but shows a later phase of the loading and unloading operation, Figure 9 shows a still later phase of the operation shown in Figures 7 and 8, Figure 10 shows a modified form of apparatus embodying this invention. Parts are broken away to illustrate certain details of construction, and Figure 11 is fragmentary view of the half-turntable shown in Figure 10 looking in the direction of arrow 11.

Referring to the drawings, this invention has been shown in one form in Figures 1, 2, 3, 4, 5, 6, 7, 8, and 9 as applied to a primary means of transportation or vehicle which I have chosen to show as baggage car 21 of the usual railroad type. Car 21 may be supported on running wheels 22 and track 23 by any of the well known means. Numeral 24 designates a portion of the station platform adjacent to the point where baggage car 21 is usually loaded and unloaded.

I have chosen to show baggage car 21 as being equipped with four unit unloaders in the form of half-turntables 25. I have also provided a secondary means of transportation or auxiliary vehicle in the form of baggage truck 26, which may be equipped with an unloader or half-turntable 27. This truck 26 is shown in Figures 1, 2, and 3 as being positioned for the loading and unloading operation. The half-turntables 25 and 27 preferably are identical and interchangeable units.

The half-turntable 25 which embodies part of this invention is best shown in Figures 5 and 6. It will be noted that I have chosen to show the half-turntable as having a semi-circular horizontal floor portion 28 and what for convenience may be referred to as a vertically positioned diametrical wall portion 29. At the center of the wall portion 29 there is located a vertical semicircular column 30 arranged so that the concave and convex portions are coaxial with the semicircular floor portion 28. The convex surface 31 of column 30 is positioned on what will be called the "inside" of the half-turntable 25, while the concave surface 32 of the column 30 is positioned on what will be called the "outside" of the half-turntable 25. Each half-turntable 25—27 is provided with a coupling means; one form of which I have chosen to show as consisting of a notched pin 33, a hole 34, and a hinged latch 35. The notched pin protrudes from the outside surface of wall 29 and when two half-turntables are joined into a complete turntable assembly, the pin 33 from each half-turntable enters hole 34 in the other half-turntable and extends through wall 29. Latch 35 is hinged as at 36 so that it can be brought into engagement with the notch in pin 33. When the pins 33 on both half-turntables are passed through the holes 34 in the other half-turntables and when both latches 35 engage the notches in pins 33, the two half-turntables will be found to be fastened together with the outside diametrical walls of both half-turntables positioned back to back. The two concave semi-circular recesses 32 fit together to form a circular recess. Also the two semi-circular floor portions 28 fit together to form a circular floor portion. The floor of each half-turntable is provided with a hole 37 the function of which will be discussed elsewhere. I have also provided a means whereby the two half-turntables 25 and 27 can be rotated. One means of accomplishing this is by means of the teeth 38 shown on the periphery of the floor portion 28 of the half-turntables 25 and 27. This feature will be more fully discussed elsewhere. However it might be said that, when the two half-turntables are fastened together, the two semi-circular floor portions 28 become in reality a large spur gear.

A number of holes 39 have been provided near the periphery of the floor portion 28 of the half-turntables 25 and 27. In Figure 6 I have chosen to show a dowel pin 40 inserted into each of these holes 39. The dowel pins make it possible to load the half-turntable to its fullest capacity.

The truck 26 consists of the usual set of four wheels 41. The two front wheels are supported from a swivelled axle 42, which can be steered in the usual manner by tongue 43. The two back wheels of the truck may be swivelled but I have chosen to show them as being attached to an unswivelled axle 44.

I have chosen to provide truck 26 with both an elevating means and a tilting means. As one means of elevating truck 26, I have provided two sets of two racks 45 and 46. One set is on one side of the truck and one set is on the other side. These racks are supported from the body of truck 26 by brackets 47. The teeth of the two racks 45 and 46 are arranged to face toward one another. Positioned between and engaging the racks is pinion 48 attached to a shaft (not shown) which is journalled (not shown) to truck 26 and which may be rotatably operated by means of crank 49. One end of rack 46 is provided with a hinged joint 50 to which is fastened one end of rod 51. The other end of rod 51 is provided with a journal bearing which supports the rear axle 44 of truck 26. Also journalled to the rear axle of truck 26 is one end of rod 52, while the other end of rod 52 is hinged to the frame of truck 26 as at 53. One end of rack 45 is hinged to rod 54 as at 55. The other end of rod 54 is hinged to a king pin supporting member 56 at the front end of the truck. Also hinged to member 56 is one end of rod 57. The other end of rod 57 is hinged to movable rack 58 which is supported from the body of truck 26 by means of bracket 47. Solidly attached to the frame of truck 26 is fixed rack 59. Fixed rack 59 and movable rack 58 provide one means of tilting truck 26. They are arranged so that their teeth face one another and positioned between them is a pinion 60 fixed to a shaft which may be rotatably operated by crank 61. By means of a king pin (not shown) front axle 42 is swivelly attached to member 56. This provided a means of steering truck 26. The front wheels 41 and tongue 43 are attached to the front axle 42 in a manner well known in the art.

The drawings show only one side of the truck, but it is to be understood that the equipment designated as rack 45 and 46, rods 51 and 52, also racks 58 and 59, rods 54 and 57 as well as other associated equipment is duplicated on the other side of the truck. Cranks 49 and 61 may be arranged to operate the elevating and tilting equipment on both sides of the truck at the same time, or duplicate cranks may be provided so that the two sides of the truck can be operated separately.

The platform of truck 26 is provided with an upper deck 62 and a lower deck 63. The lower deck 63 is provided with a multiplicity of antifriction means such as rollers 64. I have chosen to show each roller 64 as being mounted on an axle which is supported from bearings fastened to lower deck 63 of truck 26. The rollers are positioned radially around center line 65. It will of course be realized that ball bearings or some other suitable means could be substituted for the rollers 64. The upper deck 62 is elevated above the top of rollers 64 and the rear end of the upper deck is cut in the form of an arc of a circle whose center is at the center line 65. In other words the upper and lower decks of truck 26 are arranged to receive the horizontal floor portion 28 of half-turntable 25 or 27. The upper deck 62 is elevated above the top of rollers 64 a distance equal to the thickness of floor portion 28. The arc to which the upper deck is cut is also arranged to coincide with the curvature of semi-circular floor portion 28. Brace 66, hinged at 67, is fastened to upper deck 62 and extends over a portion of lower deck 63. The hinged end of brace 66 is provided with a hole 68 into which pin 69 may be placed. This brace and pin provide one means, in connection with hole 37 in the floor 28 of half-turntable 27, whereby a half-turntable 27 may be fastened to the body of truck 26.

The portion of my invention which is situated within the body of car 21 may be described as follows. Circular post 70 is built into and is part of the railroad car 21. Post 70 at its bottom is fastened to the floor structure of car 21. The top end of post 70 is fastened to the roof structure of car 21. Post 70 is colinear with a projection of the side of the car 21.

The floor of car 21 is provided with an upper floor 71 and a lower floor 72. The lower floor 72 may be considered as an under flooring, while the upper floor 71 is the service floor on which baggage and other impedimenta are placed. The upper floor 71 is cut away at several points 73 to provide space for the semi-circular floor portion 28 of half-turntable 25. The drawings show four such locations. Two such locations are on one side and two are on the other side of the car. However any suitable number of such cut away portions may be used. Since the floor 28 of half-turntable 25 is semi-circular, the cut away portion 73 of the upper flooring 71 is, of necessity, semi-circular and of a size sufficient to accommodate the half-turntable 25. This is shown at 73 in the drawings. The lower floor 72 of car 21 is provided with an anti-friction means such as rollers 74. I have chosen to show each roller 74 as being mounted on axle 75, which is supported from bearings which are in turn supported from the lower floor 72. The rollers are positioned radially around the center line of post 70. It will of course be realized that ball bearings or some other suitable means could be substituted for the rollers 74.

The wall 76 of car 21 is cut away at a sufficient number of points in such a manner that the vertical wall portion 29 of half-turntable 25 will just fit into the opening 77. The vertical post 70 is placed at the center of opening 77 and provides a bearing around which the two half-turntables 25 and 27 can be rotated as a center. It should be noted that center line 65 is coaxial with post 70.

I have chosen to provide a means by which the two joined half-turntables may be rotated. One means of doing this is shown. This consists of pinion 78 with a vertically positioned axis. Pinion 78 is supported from below by a thrust bearing 79. The upper portion of pinion 78 is provided with a square recess 80 into which the squared end of crank 81 may be placed as best shown in Figure 3. The teeth 82 on pinion 78 mesh with the teeth 38 on the periphery of the half-turntables 25 and 27. Crank 81 may be provided with a ratchet 83. This will make it possible to use the crank regardless of the position of the half-turntables 25—27. Bolts 84, supported from the fixed car wall 76, are provided as one means of holding half-turntable 25 from swinging when it is in the closed position. These bolts, when shoved to the closed position, engage the two edges of the wall 29. One bolt keeps the half-turntable 25 from rotating clockwise, while the other bolt prevents counter-clockwise rotation. The half-turntable 25 is held within the car by means of post 70 which fits into the semi-circular concave recess 32.

In the operation of this apparatus, let us assume that a baggage car 21, which is equipped with one or more half-turntables 25, is travelling along a railroad between stations. The train baggageman will sort out the mail bags and other baggage which is to be unloaded at the next station stop. He then places this impedimenta on the semicircular floor portion 28 of one of the half-turntables. If a large amount of baggage is to be unloaded, the train baggageman will insert dowel pins 40 into holes 39, and if there is still not enough unloading capacity, he will use a second half-turntable. By the time the train stops at the station, the train baggageman will have placed all baggage which is to be unloaded on the semicircular floor portion 28 of one or more of the half-turntable 25.

The station baggageman in anticipation of the arrival of baggage car 21, will have available one or more trucks 26 equipped with half-turntables 27. All of the baggage which is to be loaded into the baggage car will be placed onto one or more half-turntables 27, which are positioned on one or more trucks 26.

When the train and baggage car 21 arrives at the station, the station baggageman will place truck 26 onto platform 24 and then he will back truck 26 up against the side of car 21 as best illustrated in Figures 1, 2, and 3. The half-turntable 27 on truck 26 will be placed back to back with the half-turntable 25 which is on car 21. Any difference in elevation or in alignment between the half-turntable 27 and the half-turntable 25 can be compensated for by either moving truck 26, to properly position the half-turntable 27, by operating crank 49 to raise or lower the half-turntable 27 or by operating crank 61 to compensate for any lack of vertical alignment.

Turning crank 49 in a clockwise direction (see Figure 3) causes racks 45 and 56 to move together, thus lowering the decks 62—63 of truck 26. Turning crank 49 counter-clockwise causes racks 45 and 46 to move apart thus raising the platform 62—63 of truck 26. Turning crank 61 in a clockwise direction causes rack 58 to move toward handle 43 thus causing the front end of platform 62—63 to be lowered. This causes the wall portion 29 of half-turntable 27 to lean slightly away from the car 21 (see Figure 3). Turning crank 61 counter-clockwise causes rack 58 to move away from handle 43 thus causing the front end of platform 62—63 to be raised. This causes the wall portion 29 of half-turntable to incline slightly toward the car 21 (see Figure 3). Thus the half-turntable 27 can be lined up with half-turntable 25. While the two half-turntables are being lined up, pin 33 on each half-turntable 25—27 enters hole 34 of the other half-turntable. The station baggageman closes one latch 35 while the train baggageman closes the other latch 35, thus fastening the two half-turntables together. When this has been accomplished, the train baggageman opens both sets of bolts 84, and the station baggageman removes pin 69 thus releasing the half-turntables 25—27 so that they can be made to rotate. Then the train baggageman inserts the square end of crank 81 into the square socket 80 of pinion 78, and turns crank 81 in either direction. The teeth of pinion 78 engage the teeth 38 on the periphery of half-turntables 25—27. Turning crank 81 causes both half-turntables to rotate. Crank 81 is provided with a ratchet 83 which makes it possible for the train baggageman to operate crank 81 regardless of the amount of load being carried on the floor 28. The ratchet also makes it possible to operate the crank 81 at the point where the two half-turntables are rotated 90 degrees from their original position. If it were not for this ratchet the edges of walls 29 might keep crank 81 from turning. From this it can be seen that the half-turntable 25 can be rotated from its original position on the baggage car to a new position on the truck, and that the half-turntable 27 can be rotated from its original position on the truck to a new position on the car. Thus we can say that the two half-turntables are rotatably removed from their original vehicle, or we can say that the two half-turntables have been rotatably interchanged.

As soon as the two half-turntables have been rotated 180 degrees, the train baggageman stops turning crank 81, closes both bolts 84, and thus fastens the newly received half-turntable into the car. The latches 35 are then opened, one by each baggageman. The station baggageman fastens the newly received half-turntable to the baggage truck 26 by placing pin 69 through the hole 68 in hinged bar 66, and on into hole 37 in the half-turntable.

The truck 26 may be then taken or taken or pulled away from car 21, to complete the very simple and rapid loading and unloading operation.

It will of course be realized that two separate trucks would be required to remove two separate half-turntables 25 from car 21. This however is a fewer number of trucks than are now generally used to load and unload a baggage car.

Three different phases of the loading and unloading operation are depicted in Figures 7, 8, and 9. These drawings show the operation as it would appear to an observer from within the car. The three Figures 7, 8, and 9 show bolts 84 as being drawn to the open position. They also show the two half-turntables 25 and 27 in the process of rotating. Half-turntable 25 is shown as carrying a box, while the half-turntable 27 is shown as carrying a keg 86. Box 85 is being unloaded from baggage car 21, while keg 86 is being loaded into baggage car 21.

I wish to point out that the equipment used in connection with my invention in no way interferes with the normal operation of the baggage car 21. The floor 28, and the wall 29 of half-turntable 25 becomes part of or is recessed into the floor and the wall of car 21. The operating mechanisms 38 and 78, bolts 84, post 70, etc. are so placed that they are not in the way. This feature of my invention can best be seen by reference to Figure 3, which shows that the inside of the car is free from any fixed protrusions, which might get in the way of the train baggageman in the normal operation of the baggage car.

A modified form of half-turntable is illustrated in Figures 10 and 11. These drawings show half-turntable 25 as consisting of a semi-cylindrical box or tank 87, having a semi-circular base, a semi-circular side and a diametrical side. This container 87 may be constructed to hold liquids, grain, etc. and it may be made with a hinged door 88 which may be locked by means of lock 89. In any event it would be possible for a manufacturer to load container 87 at his factory, transport it to the station on a truck, and then load the container onto an express car. When it arrives at its destination, it can be transported to the consignee without being opened at the station. It will be noted that I have provided recess 90 in order that latch 35 may be made to function properly.

The operation of this modified form of half-turntable 26—87 shown in Figures 10 and 11, is similar to the operation previously described. The main difference being that the half-turntable container 87 is not loaded and unloaded at the station or while in transit, but is loaded and unloaded at the plant of origin and destination.

While I have illustrated and described the preferred embodiment of my invention, it is to be understood that the invention may be otherwise embodied and practiced within the scope of the following claims.

What I claim as new and desire to secure by Letters Patent of the United States is:

1. Means for loading and unloading vehicles comprising a half-turntable having a diametrical side and a semi-circular base rotatably supported on a primary vehicle, a second half-turntable having a diametrical side and a semi-circular base rotatably supported on an auxiliary vehicle, coupling means for joining together the diametrical sides of the said two half-turntables, a multiplicity of teeth on the periphery of said semi-circular bases, a pinion supported from said primary vehicle and arranged to mesh with said teeth on said semi-circular bases, and a means for rotating said pinion, whereby the half-turntable supported on the primary vehicle may be transferred to the secondary vehicle and vice versa.

2. Means for loading and unloading vehicles comprising a half-turntable built into but rotatably removable from a first vehicle, a second half-turntable built into but rotatably removable from a second vehicle, means for joining together the diametrical portions of said two half-turntables, and means for rotatably interchanging said two half-turntables.

3. Means for loading and unloading vehicles comprising a half-turntable built into but rotatably removable from a first vehicle, a second half-turntable built into but rotatably removable from a second vehicle, a notched pin on the diametrical side of each of said half-turntables, a hole in the diametrical side of each of said half-turntables whereby the hole on each half-turntable will receive the notched pin from the other of said half-turntables, a hinged latch on each turntable arranged to engage and hold the notched pins in place, and means for rotatably interchanging said half-turntables.

4. In combination a vehicle and an unloader for said vehicle; said vehicle comprising a set of wheels, a floor, a side wall, a roof, and a circular post extending from said floor to said roof colinear with a projection of said side wall; said unloader comprising a wall portion having a semi-circular recess coaxial with said post, and a semi-circular floor portion coaxial with said semi-circular recess; said floor of said vehicle being cut away to receive said semi-circular floor portion, and said wall of said vehicle having an opening arranged to receive said wall portion of said unloader.

5. In combination a vehicle, and an unloader for said vehicle; said vehicle comprising a set of running wheels, a floor, a side wall having an opening therein, a roof, and a vertically positioned circular post extending from said floor to said roof colinear with a vertical projection of said side wall and positioned at the mid point of said opening in said side wall; said unloader comprising a vertical wall having a vertically positioned semi-circular recess coaxial with said post, and a semi-circular floor portion coaxial with said semi-circular recess; said floor of said vehicle being cut away to receive said semi-circular floor portion.

6. In combination a primary means of transportation, a secondary means of transportation, a half-turntable on said primary means of transportation, a second half-turntable on said secondary means of transportation, means for coupling together the said two half-turntables, and means for simultaneously and rotatably interchanging said two half-turntables.

7. In combination a baggage car, a baggage truck, a half-turntable mounted on said baggage car, a second half-turntable mounted on said baggage truck, means for coupling together said two half-turntables, and means for simultaneously rotatably interchanging said two half-turntables.

8. A unit device for use in loading and unloading operations comprising a semi-circular horizontal floor member, a vertical wall member fastened to said floor member, said wall member having a semi-circular recess positioned coaxially with said semi-circular floor member, and coupling devices arranged whereby said wall member may be coupled to a similar wall member on another unit device.

9. In combination a railroad car, a baggage truck, a half-turntable mounted on said railroad car, a second half-turntable mounted on said baggage truck, a notched pin on the outside of each of said half-turntables, a hole in each of said half-turntables arranged to receive the pin from the other of said half-turntables, a hinged latch on each half-turntable arranged to engage and hold said notched pin in place, and means for rotating said two half-turntables.

10. In combination a railroad car, a baggage truck, a half-turntable mounted on said railroad car, a second half-turntable mounted on said baggage truck, a means for fastening said two half-turntables together, and means for rotatably interchanging said two half-turntables comprising a multiplicity of teeth on the periphery of said half-turntables, a pinion supported from said railroad car and arranged to mesh with said teeth on said half-turntables, and a means for rotatably turning said pinion.

11. In combination a railroad car, a baggage truck, a half-turntable mounted on said railroad car, a second half-turntable mounted on said baggage truck, a notched pin on the outside of each of said half-turntables, a hole in each of said half-turntables arranged to receive the notched pin from the other of said half-turntables, a hinged latch on each of said salf-turntables arranged to engage and hold said notched pin, and means for rotatably interchanging said two half-turntables comprising a multiplicity of teeth on the periphery of said half-turntables, a pinion supported from said railroad car and arranged to mesh with a group of said teeth on said half-turntables, and a crank for turning said pinion.

12. In combination a primary vehicle; an unloader mounted on said vehicle; an auxiliary vehicle; and a second unloader mounted on said auxiliary vehicle, each of said unloaders comprising a half-turntable having a semi-circular horizontal floor member, a vertical wall member fastened to said floor member and having a semi-circular recess positioned co-axially with said semi-circular floor member, and means for coupling together said two half-turntables; said primary vehicle having a vertical post around which said coupled half-turntables may be rotated.

13. In combination a first means of transportation, a second means of transportation, a load of impedimenta mounted on said first means of transportation, a second load of impedimenta mounted on said second means of transportation, a pair of unloaders, one located on each means of transportation, and means for coupling together the said two unloaders for simultaneously and rotatably interchanging the said two loads of impedimenta.

14. A semi-circular container for use in transporting impedimenta comprising a semi-circular base, a diametrical side and a semi-circular side wall, said diametrical side wall having a bearing member co-axial with said semi-circular side, coupling means arranged whereby the said diametrical side wall may be coupled to a similar side wall of another container.

15. Means for loading and unloading a vehicle comprising a rotatable member located on but rotatably removable from the said vehicle, a second rotatable member, means for joining together the said two members, and means for rotatably interchanging the said members.

16. Means for loading and unloading a vehicle comprising a half-turntable located on but rotatably removable from the said vehicle, a second half-turntable, means for joining together similar portions of the said two half-turntables, and means for rotatably interchanging the said half-turntables.

17. In combination a vehicle, and an unloader for the said vehicle; said vehicle having a side wall with an opening therein, a bearing member located in the said opening; said unloader comprising a vertical wall having a means for cooperating with the said bearing member on the said vehicle, and a floor portion secured to and substantially perpendicular to the said wall portion.

FORD C. PETHICK.